(12) United States Patent
Forster

(10) Patent No.: US 11,334,783 B2
(45) Date of Patent: May 17, 2022

(54) DIRECT ATTACHMENT OF RFID CHIPS TO METALLIC STRUCTURES AS PART OF A FABRIC LABEL

(71) Applicant: AVERY DENNISON RETAIL INFORMATION SERVICES, LLC, Mentor, OH (US)

(72) Inventor: Ian J. Forster, Chelmsford (GB)

(73) Assignee: Avery Dennison Retail Information Services, LLC., Mentor, OH (US)

( * ) Notice: Subject to any disclaimer, the term of this patent is extended or adjusted under 35 U.S.C. 154(b) by 0 days.

(21) Appl. No.: 16/286,320

(22) Filed: Feb. 26, 2019

(65) Prior Publication Data
US 2019/0266464 A1      Aug. 29, 2019

Related U.S. Application Data

(60) Provisional application No. 62/635,246, filed on Feb. 26, 2018.

(51) Int. Cl.
*G06K 19/077* (2006.01)
(52) U.S. Cl.
CPC . *G06K 19/07758* (2013.01); *G06K 19/07718* (2013.01); *G06K 19/07745* (2013.01); *G06K 19/07773* (2013.01)
(58) Field of Classification Search
CPC ....... G06K 19/07718; G06K 19/07745; G06K 19/07758; G06K 19/07773; B23K 3/04; B23K 20/023; B23K 20/025
(Continued)

(56) References Cited

U.S. PATENT DOCUMENTS

| 5,528,222 A * | 6/1996 | Moskowitz ...... G06K 19/07749 340/572.7 |
| 8,359,729 B2 | 1/2013 | Martinent et al. |

(Continued)

FOREIGN PATENT DOCUMENTS

| CN | 101836325 | 9/2010 |
| CN | 102742379 | 10/2012 |

(Continued)

OTHER PUBLICATIONS

International Search Report and Written Opinion dated Jun. 5, 2019 issued in corresponding IA No. PCT/US2019/019632 filed Feb. 26, 2019.

(Continued)

*Primary Examiner* — Suezu Ellis
(74) *Attorney, Agent, or Firm* — Avery Dennison Retail Information Services, LLC.

(57) ABSTRACT

Systems and methods are provided for assembling an RFID device mounted to a fabric substrate via a "flip chip" approach. The system includes a pin thermode with a tip configured to penetrate the fabric substrate. The pin thermode may include or omit a heating element, with the tip being variously configured. The tip may have a variable cross-sectional area or include a plurality of projections that separately penetrate the fabric substrate, for example. If the pin thermode includes a heating element, a body of the pin thermode may be formed of a low thermal conductivity material to allow the temperature of the tip to increase without increasing the temperature of the body to the same degree. The body may define a lumen, with the tip and/or body defining an aperture for flowing a liquid out of the pin thermode and into the region surrounding the pin thermode.

6 Claims, 4 Drawing Sheets

(58) Field of Classification Search
USPC .................................... 235/492; 340/572.1
See application file for complete search history.

(56) References Cited

U.S. PATENT DOCUMENTS

| | | |
|---|---|---|
| 2009/0261074 A1 | 10/2009 | Weckerle et al. |
| 2010/0147958 A1* | 6/2010 | Martinent ............ G06K 19/027 235/492 |
| 2013/0074327 A1 | 3/2013 | Buhler |
| 2016/0352005 A1* | 12/2016 | Weinberger .............. H01Q 1/38 |

FOREIGN PATENT DOCUMENTS

| | | |
|---|---|---|
| DE | 102005038416 | 9/2006 |
| EP | 2355645 | 8/2011 |
| JP | 11354593 | 12/1999 |

OTHER PUBLICATIONS

International Preliminary Report on Patentability dated Aug. 27, 2020 issued in corresponding IA No. PCT/US2019/019632 filed Feb. 26, 2019.

\* cited by examiner

DIRECT ATTACHMENT OF RFID CHIPS TO METALLIC STRUCTURES AS PART OF A FABRIC LABEL

CROSS REFERENCE TO RELATED APPLICATION(S)

The present application claims priority to and the benefit of U.S. provisional utility patent application No. 62/635,246 filed Feb. 26, 2018, which is incorporated by reference herein in its entirety.

BACKGROUND

Field of the Disclosure

The present subject matter relates to radio frequency identification ("RFID") devices mounted to a flexible f substrate, such as fabric. More particularly, the present subject matter relates to mounting RFID devices to fabric substrates using a "flip chip" approach without unduly damaging the substrate.

Description of Related Art

Devices incorporating wireless communication approaches including RFID technology are widely used for a variety of different applications, including inventory control, tracking, guard, and security systems. Such systems are well known in the retail industry, including in connection with clothing inventory control and security from theft and other losses.

RFID devices may have a variety of integrated components, such as an RFID chip containing data like an identification code for the type of product and/or product component, allowing for immediate electronic identification and tracking of the exact piece of goods associated with a unique identification code. Other components include at least one antenna electrically connected to the RFID chip, which is responsible for transmitting signals to and/or receiving signals from another RFID device, for example, an RFID reader system.

In one example, an RFID reader is associated with a point-of-sale location or check-out counter of a retail facility and detects the chip in a tag associated with a piece of goods, which can include the stock keeping unit (SKU) and register price of that item, as well as other specific identification indicia. In another example, an RFID-readable tag is attached to a piece of merchandise in a retail facility, which tags are scanned using an RFID reader to keep proper count of the product inventory and/or to be used as a security measure functioning as a so-called guard tag.

Typical RFID devices currently in the marketplace are susceptible to damage and reduction or elimination of expected operability upon exposure to the conditions of industrial processing of clothing, components or other items or products, particularly those made of fabric material. Such susceptibility can be experienced before, during and/or after manufacturing and processing and subsequent warehousing, merchandising, use and handling by consumers.

One conventional approach to producing RFID devices is commonly referred to as a "flip chip" or direct chip attachment approach. According to such an approach, an RFID chip is pushed into the surface of an antenna formed of a suitable conductive material such as aluminium or copper foil. The RFID chip is oriented with its conductive connections facing toward the foil, and secured using an adhesive. Typically, the adhesive is a form of an epoxy with particles such as plastic beads plated with gold incorporated into it. Such adhesive is commonly referred to as "anisotropic conductive paste." The adhesive is, in one embodiment, non-conductive in its state before application, but when the RFID chip is pushed down so its conductive connection bumps are in proximity to or touch the foil, a conductive connection is made, which can be assisted by the particles becoming trapped in the interface.

Once the RFID chip is in place with the adhesive between it and the foil, the adhesive needs to be cured. Typically, this is achieved by applying pressure and heat using two metal blocks, one under the antenna and one above the RFID chip. These metal blocks are commonly referred to as "thermodes." Process conditions vary depending on the size of the RFID chip and nature of the substrate; however, for a 400 $\mu m^2$ RFID chip, a force of 1 N applied using a 180° C. top thermode (i.e., the thermode positioned closest to the RFID chip) and a 160° C. bottom thermode (i.e., the thermode positioned closest to the antenna) for one to ten seconds is typically suitable for curing the adhesive and completing the joint.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, this disclosure has recognized that when foil as discussed above is mounted on some form of base material or support structure having a sufficient degree of temperature resistance, such as polyethylene terephthalate ("PET") or paper, the heat of attachment does not damage the base material significantly. The present disclosure provides a method of achieving the same result for delicate fabric substrates without causing damage to the fabric, because a typical thermode will compress and heat the fabric over a large area.

In another aspect or embodiment of the present disclosure, a pin thermode is provided for connecting an RFID chip to an antenna associated with a fabric substrate. The pin thermode includes a body and a tip associated with the body, with the tip being configured to penetrate the fabric substrate so as to be moved into contact with or into the vicinity of the antenna.

In a further aspect or embodiment of the present disclosure, a pin thermode is provided for connecting an RFID chip to an antenna associated with a fabric substrate. Instead of a flat thermode or thermodes, two pins are provided, such as a top and bottom pin, with at least the bottom pin having sufficient surface area to cover the base of the chip and, when desired, providing heat to the chip-to-antenna joint being formed while the pin is configured to penetrate the fabric substrate so as to be moved into contact with or into the vicinity of the antenna. Alternatively, the bottom pin is not heated, with the needed heat coming from the top pin, whereby the bottom pin functions similar to an anvil for the chip to be pushed against as the adhesive is cured by conduction from the top pin.

In another aspect or embodiment of the present disclosure, a pin thermode is provided for connecting an RFID chip to an antenna associated with a fabric substrate. The pin thermode includes a body and a tip or cap associated with the body, with the tip being configured to penetrate the fabric substrate so as to be moved into contact with or into the vicinity of the antenna. The pin thermode, for example, a bottom thermode, includes two coaxial structures supporting the tip or cap, with a heating element coaxially positioned within the body of the pin thermode, facilitating controlled heating as desired to not damage fabric supporting the chip.

In an additional aspect or embodiment of the present disclosure, a pin thermode is provided for connecting an RFID chip to an antenna associated with a fabric substrate. The pin thermode includes a body and a tip associated with the body, with the tip being configured to penetrate the fabric substrate so as to be moved into contact with or into the vicinity of the antenna. The pin thermode is configured such that its width at the location where it contacts the chip mushrooms out, by applying pressure to or pulling down to provide an increased area that is narrower before expanding or mushrooming, to facilitate passing through the fabric in its narrower state. Typically, such structure is provided by the bottom pin thermode.

In another aspect or embodiment of the present disclosure, a pin thermode is provided for connecting an RFID chip to an antenna associated with a fabric substrate. The pin thermode includes a body and a tip associated with the body, with the tip being configured to penetrate the fabric substrate so as to be moved into contact with or into the vicinity of the antenna. The pin thermode, e.g. a bottom pin, has an array of narrow pins to more easily pass through the fabric than a wider pin or pins, whereby pressure and heat are applied to selected points where required to form a good bond.

In another aspect or embodiment of the present disclosure, a pin thermode is provided for connecting an RFID chip to an antenna associated with a fabric substrate. The pin thermode includes a body and a tip associated with the body, with the tip being configured to penetrate the fabric substrate so as to be moved into contact with or into the vicinity of the antenna. The pin thermode, e.g. a bottom pin, is increased in temperature either as it penetrates the fabric or after when it contacts the chip-attach area that fuses an area of adhesive, creating a relatively strong reinforcing point under the chip, reducing flexing that otherwise might break the chip-to-antenna joint.

In yet a further aspect or embodiment of the present disclosure, a pin thermode is provided for connecting an RFID chip to an antenna associated with a fabric substrate. The pin thermode includes a body and a tip associated with the body, with the tip being configured to penetrate the fabric substrate so as to be moved into contact with or into the vicinity of the antenna. The pin thermode, e.g. a bottom pin, includes an aperture or multiple apertures in fluid communication with a lumen of the pin thermode for a liquid to advance out of the aperture or apertures and to the region surrounding the pin thermode.

In another aspect or embodiment, a method is provided for assembling an RFID device. The method includes providing an RFID chip in the vicinity of an antenna associated with a fabric substrate with an adhesive positioned between the RFID chip and the antenna. Pressure and heat are applied to the RFID chip and/or the antenna using a top thermode and a pin thermode so as to cure the adhesive, which involves penetrating the fabric substrate with a tip of the pin thermode to move the tip into contact with or into the vicinity of the antenna.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
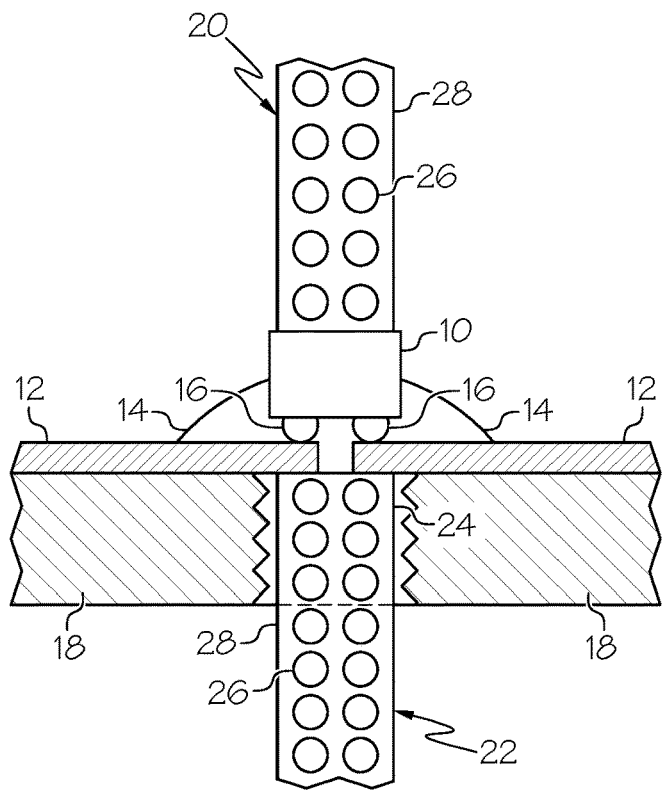
FIG. 1 is a cross-sectional, side elevational view of an embodiment of a pair of pin thermodes configured according to an aspect of the present disclosure in the process of assembling an RFID device mounted to a fabric substrate.

FIG. 1 illustrates the assembly of an RFID device using one approach according to the present disclosure. The RFID device may be provided according to conventional design, with an RFID chip 10, an associated antenna 12, and an adhesive 14. The RFID chip 10 is oriented with its conductive connections 16 facing toward the antenna 12, for a "flip chip" or direct chip attachment approach. As for the antenna 12, it is mounted to or otherwise associated with a fabric substrate 18, such as a patch, an article of clothing, or a tag or label of an article of clothing. The antenna 12 may be an antenna of any shape contemplated by the art. In one embodiment, the antenna is a dipole FIG. 1 illustrates a pair of similarly configured thermodes 20 and 22, with a top thermode 20 positioned closer to the RFID chip 10 and a bottom thermode 22 positioned closer to the antenna 12, but spaced from the antenna 12 by the substrate 18, which as discussed herein is fabric. It is important to note that the present invention is not limited to a fabric substrate, but may be any other type of flexible substrate known in the art. In the embodiment of FIG. 1, both thermodes 20 and 22 are configured as pin thermodes, which each have a tip 24 with a smaller cross-sectional area (i.e., the surface facing the other thermode and the components of the RFID device in the orientation of FIG. 1) than a conventional flat thermode. For example, a conventional flat thermode may have a cross-sectional area on the order of cross-sectional area of conventional thermode of approximately 100 mm$^2$ (or in a range between 10 mm$^2$ and 100 mm$^2$), whereas a pin thermode according to the present disclosure may have a tip 24 with a cross-sectional area on the order of a cross-sectional area of approximately tip 1 mm$^2$ (or in the range of approximately 0.25 mm$^2$ to 1 mm$^2$ depending on the size of the RFID chip). In one embodiment, a pin thermode may have a cross-sectional area that is less than a cross-sectional area of the associated RFID chip or, at most, substantially equal to the cross-sectional area of the associated RFID chip to ensure that pressure and heat are applied to the necessary portions of the adhesive. However, it is also within the scope of the present disclosure for the cross-sectional area of a pin thermode to be larger than the cross-sectional area of the associated RFID chip, though preferably no more than nominally greater.

While the top thermode 20 may be provided according to conventional design, the illustrated pin configuration is particularly advantageous for the bottom thermode 22. As described above, a conventional thermode will compress a fabric substrate and heat the fabric over a large area, whereas the tip 24 of a bottom pin thermode 22 is shaped so as to instead penetrate into the fabric substrate 18 to move into contact with or at least into the vicinity of the antenna 12. If the bottom thermode 22 is provided with a heating element 26 associated with the tip 24 and/or a body 28 of the bottom thermode 22 (as in the embodiment of FIG. 1, in which the top thermode 20 also includes a heating element 26), then heat applied by the bottom thermode 22 to the fabric substrate 18 will be reduced to a much smaller area (i.e., the immediate region surrounding the portion of the bottom thermode 22 penetrating the fabric substrate 18). Thus, if the bottom thermode 22 has a substantially circular or circular cross-sectional shape, then heat would be applied only to a small cylindrical region of the fabric substrate 18, rather than over a much larger area, which greater reduces the damage done to the fabric substrate 18 in assembling the RFID device.

If the bottom thermode 22 is provided with a heating element 26, then it may be advantageous for it to apply less heat to the RFID device than the top thermode 20 to further reduce the amount of damage to the fabric substrate 18. For example, in one embodiment, the top thermode 20 may be configured to be heated to a temperature of 180° C., while all or a portion of the tip 24 of the bottom thermode 22 may be configured to be heated to a lower temperature. In one embodiment, the tip 24 (or a portion thereof) of the bottom thermode 22 may be configured to be heated to 160° C., as in a conventional "flip chip" approach. In another embodiment, the tip 24 (or a portion thereof) of the bottom thermode 22 is heated to some lower temperature, which may be dependent upon a critical temperature of the associated fabric substrate 18 where the visual finish is effected or distortion is caused locally. For example, if the fabric substrate is comprised of a polyester, it may have a critical temperature of approximately between 120° C. and 290° C., depending on composition, the lower temperature being in the glass transition region were the material becomes soft and can easily distort under pressure, and the higher value related to melting. It will be appreciated that localized damage to the look and feel of a fabric is important to avoid for clothing in which case the tip 24 (or a portion thereof) of the bottom thermode 22 may be heated to a temperature less than a critical temperature of exemplary fabric material to minimize damage to the fabric substrate 18, for example a spot or blemish. In yet another embodiment, the tip 24 (or a portion thereof) of the bottom thermode 22 may be heated to a first temperature as the tip 24 is penetrating the fabric substrate 18 and then heated to a higher second temperature once it has been moved into its final position for curing the adhesive 14.

Figure 2:
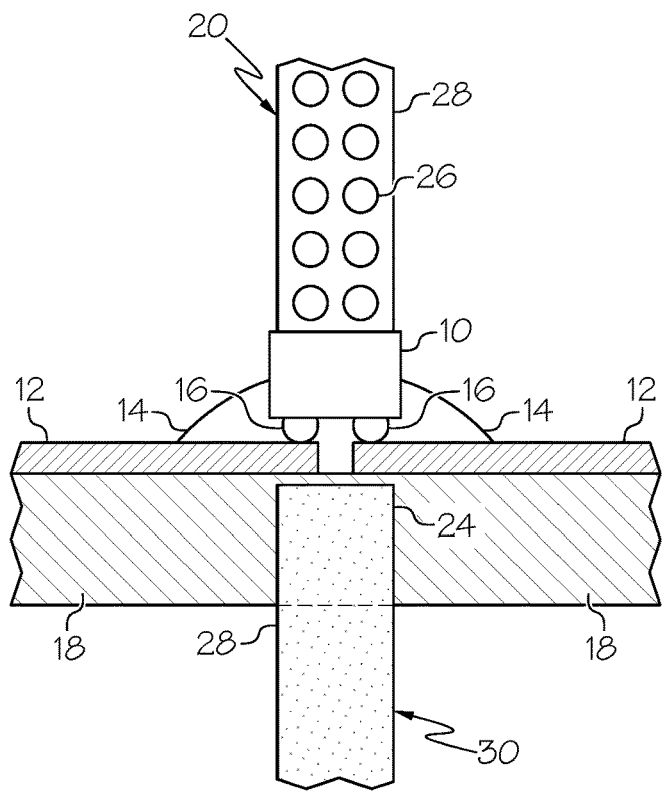
FIG. 2 is a cross-sectional, side elevational view of another embodiment of a pair of pin thermodes configured according to an aspect of the present disclosure in the process of assembling an RFID device mounted to a fabric substrate.

In yet another embodiment, which is illustrated in FIG. 2, the bottom thermode 30 is configured as in FIG. 1, but omits a heating element, such that the unheated bottom thermode 30 acts as an anvil for the RFID chip 10 to be pushed against as the adhesive 14 is cured by conduction from the top thermode 20. Alternatively, the same effect may be achieved using the bottom thermode 22 of FIG. 1 without operating its heating element 26. By foregoing the application of heat by the bottom thermode 30 and instead applying all heat using the top thermode 20, even less damage is done to the fabric substrate 18 when curing the adhesive 14.

A comparison of FIGS. 1 and 2 illustrates different possible final positions for the bottom thermode 22, 30 for curing the adhesive 14. In the embodiment of FIG. 1 (in which the bottom thermode 22 is heated), the tip 24 of the bottom thermode 22 is moved into contact with the antenna 12. This may be advantageous when the tip 24 of the bottom thermode 22 is heated to improve the application of heat from the tip 24 to the adhesive 14. In contrast, in the embodiment of FIG. 2 (in which the bottom thermode 30 is not heated), the tip 24 is moved into the vicinity of the antenna 12, without contacting the antenna 12. As the bottom thermode 30 is not applying heat to the adhesive 14, it is not as important for the tip 24 to be brought into contact with the antenna 12. Additionally, moving the tip 24 into the vicinity of the antenna 12 without actually contacting the antenna 12 may further reduce the damage done to the fabric substrate 18, as it does not penetrate completely through the fabric substrate 18. However, while FIG. 1 illustrates a heated bottom thermode 22 being moved into contact with the associated antenna 12 and FIG. 2 illustrates an unheated bottom thermode 30 being moved only into the vicinity of the associated antenna 12, it should be understood that it is within the scope of the present disclosure for a heated bottom thermode 22 to be moved only into the vicinity of the associated antenna 12 (rather than contacting it) and for an unheated bottom thermode 30 to be moved into contact with the associated antenna 12.

Figure 3:
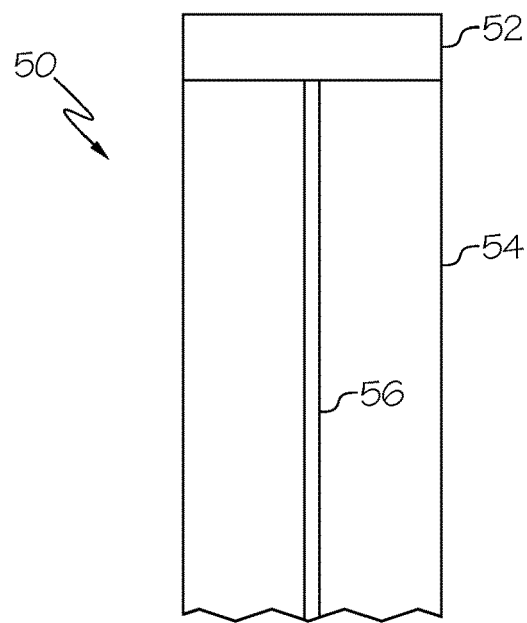
FIG. 3 is a cross-sectional, side elevational view of an embodiment of a pin thermode according to an aspect of the present disclosure.

FIG. 3 shows an alternative configuration for a pin thermode 50. In the embodiment of FIG. 3, the pin thermode 50 includes a cap or tip 52 and an associated body 54, with the cap or tip 52 oriented to be closer to the associated RFID device than the body 54. The pin thermode 50 further includes a heating element 56 associated with the tip 52 and extending at least partially through the body 54. In the illustrated embodiment, the heating element 56 is coaxial with the body 54, but it is within the scope of the present disclosure for the heating element 56 to be non-coaxially positioned within the body 54.

The heating element 56 may be variously configured without departing from the scope of the present disclosure, but in exemplary embodiments is configured as either a conductive path for heat or an electrical path for a heater associated with the tip 52. Regardless of its exact configuration, the heating element 56 is configured to increase the temperature of the tip 52 of the pin thermode 50, as described above with respect to the embodiment of FIG. 1. While the heating element 56 increases the temperature of the tip 52, the body 54 is configured such that its outer surface is not heated by the heating element 56 or is at least not heated to the same temperature as the tip 52. In embodiments in which heat is passed through the body 54 (i.e., when the heating element 56 comprises a conductive path for heat), the body 54 may be made of a low thermal conductivity material, such as, but not limited to PTFE or a foamed PTFE, to limit the change in temperature at the outer surface of the body 54 so that less heat is applied to a fabric substrate it has penetrated. In one embodiment, a material with a low friction surface is utilized as it will slide through the fabric with less force and potential to cause damage.

Figures 4, 4A:
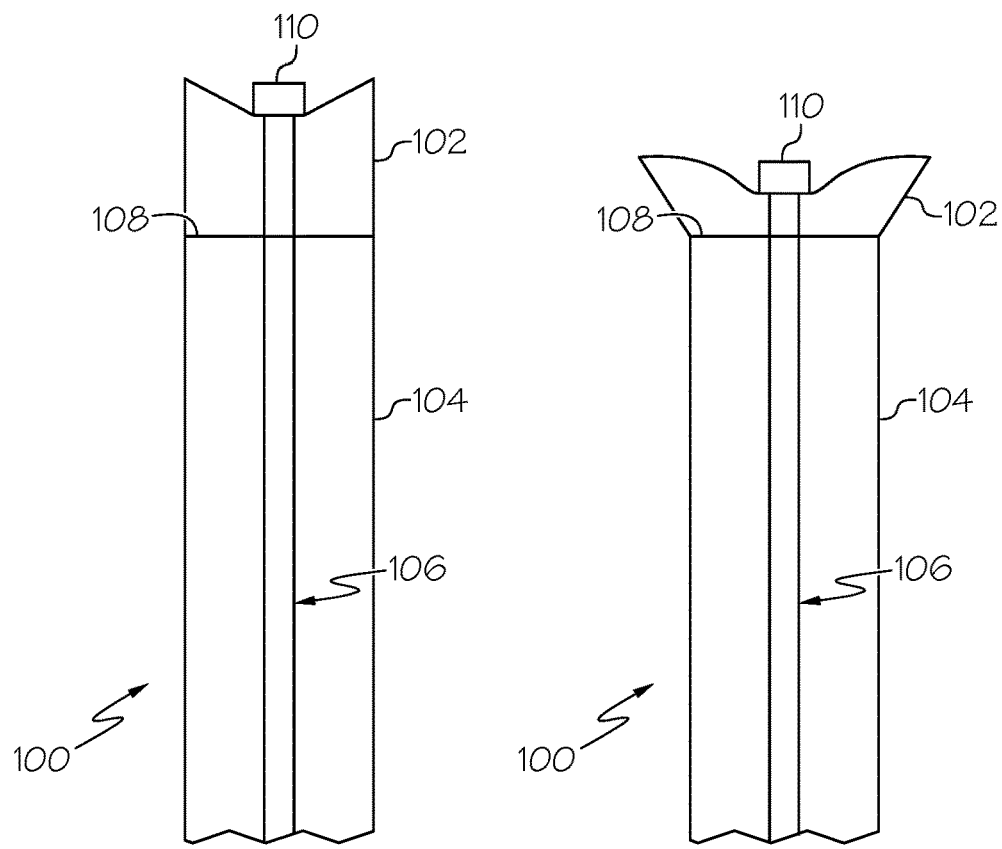
FIG. 4 is a cross-sectional, side elevational view of another embodiment of a pin thermode according to an aspect of the present disclosure, in a first configuration.
FIG. 4A is a cross-sectional, side elevational view of the pin thermode of FIG. 4, in a second configuration.

FIGS. 4 and 4A show another alternative embodiment of a pin thermode 100 according to an aspect of the present disclosure. In the embodiment of FIGS. 4 and 4A, the pin thermode 100 includes a tip 102 and a body 104, as in other embodiments. The pin thermode 100 further includes an actuator 106, which is operable to move the tip 102 (or at least a portion thereof) between a first configuration (FIG. 4) and a second configuration (FIG. 4A) in which the tip 102 has a different cross-sectional area. The first configuration is intended for easy penetration of a fabric substrate, while the second configuration is intended for increasing the area over which the tip 102 contacts or otherwise applies force to an RFID device during curing of its adhesive.

The particular configuration of the tip 102 may vary, which may also affect the particular configuration of the associated actuator 106. In one embodiment, the tip 102 is formed of a deformable or flexible material (e.g., an elastomeric material) secured to a distal end 108 of the body 104. In such an embodiment, the actuator 106 may be configured as an elongated rod with an enlarged end 110, which is moved proximally to compress the tip 102 against the distal end 108 of the body 104, causing the tip 102 to expand outwardly for an enlarged cross-sectional area. In another embodiment, the tip 102 is formed of a plurality of rigid or semi-rigid members configured as petals pivotally or otherwise movably connected to the distal end 108 of the body 104. In such an embodiment, the actuator 106 may be moved proximally to deploy the individual members or may be manipulated in some other manner (e.g., by being rotated about its central axis) to deploy the individual members to the expanded configuration of FIG. 4A. Other configurations of the tip 102 may also be employed without departing from the scope of the present disclosure, with the optimal configuration depending on any of a number of factors, such as the thickness and material composition of the associated fabric substrate, the cross-sectional area of the associated RFID, and whether the tip 102 is to be heated.

Figure 5:
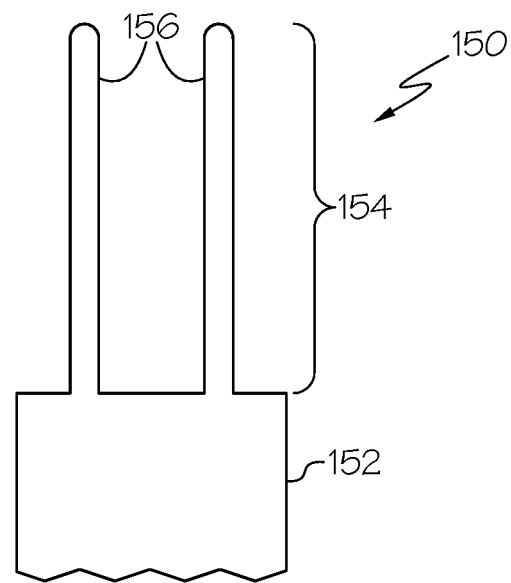
FIG. 5 is a side elevational view of another embodiment of a pin thermode according to an aspect of the present disclosure.
Figure 6:
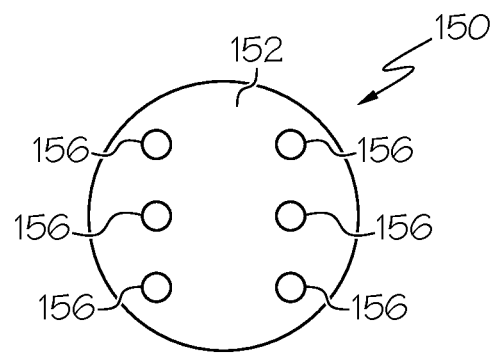
FIG. 6 is a top plan view of the pin thermode of FIG. 5.

FIGS. 5 and 6 show another alternative embodiment of a pin thermode 150 according to an aspect of the present disclosure. In the embodiment of FIGS. 5 and 6, the pin thermode 150 includes a body 152 and an associated tip 154, with the tip 154 being comprised of a plurality of projections 156 (which may be heated or unheated) that separately penetrate an associated fabric substrate. In the illustrated embodiment, the projections 156 are substantially identical (to better ensure a uniform application of pressure and/or heat to the RFID device) and extend in parallel (to better ensure penetration through the fabric substrate), but it is within the scope of the present disclosure for at least two of the projections 156 to be differently configured and/or for at least two of the projections 156 to be non-parallel. It may be advantageous for the projections 156 to be sufficiently elongated so as to be capable of penetrating entirely through the associate fabric substrate without the body 152 of the pin thermode 150 also penetrating the fabric substrate in order to minimize any damage caused to the fabric substrate. However, it is also within the scope of the present disclosure for both the projections 156 and a portion of the body 152 to penetrate the fabric substrate.

Figure 7:
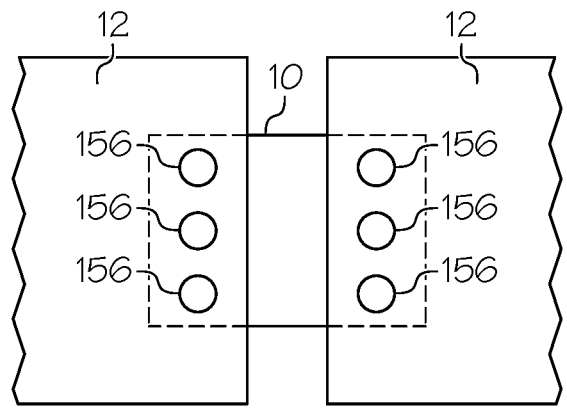
FIG. 7 is a top plan view of the pin thermode of FIGS. 5 and 6 in the process of assembling an RFID device mounted to a fabric substrate.

FIG. 7 illustrates the positions of the projections 156 with respect to an associated RFID chip 10 and antenna 12, which may correspond to the positions of the conductive connections of the RFID chip 10, such that each projection 156 applies pressure to one of the conductive connections. However, it should be understood that the positions of the projections with respect to the conductive connections of an associated RFID chip may vary without departing from the scope of the present disclosure, provided that the selected points at which the projections apply pressure and/or heat to the RFID device is sufficient to form an acceptable bond between the RFID chip and the antenna.

Figure 8:
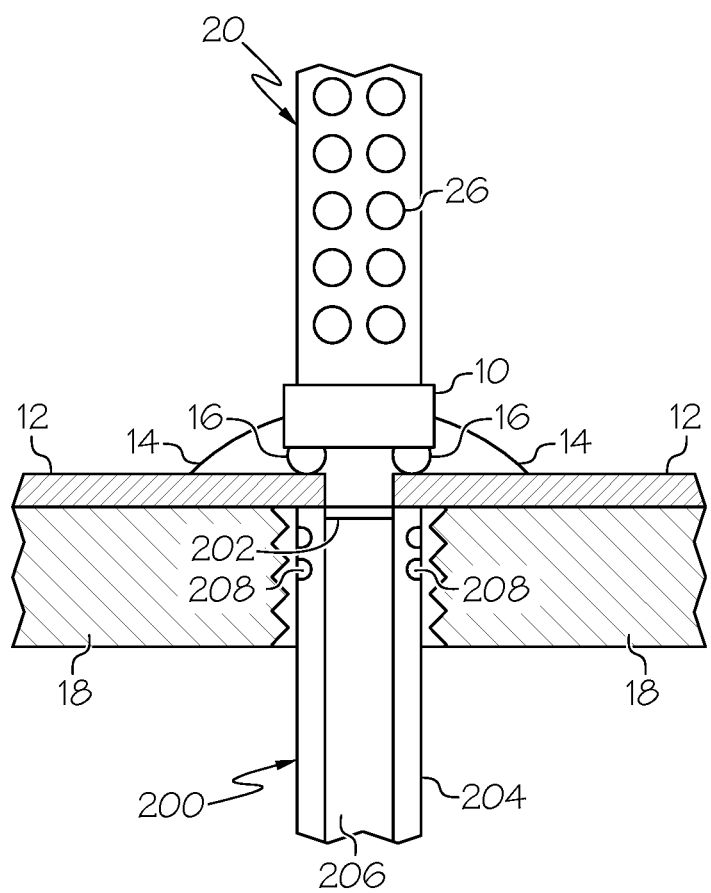
FIG. 8 is a cross-sectional, side elevational view of another embodiment of a pair of pin thermodes configured according to an aspect of the present disclosure in the process of assembling an RFID device mounted to a fabric substrate.

FIG. 8 shows the assembly of an RFID device using another embodiment of a pin thermode 200 according to an aspect of the present disclosure. In the embodiment of FIG. 8, the pin thermode 200 (which may be heated or unheated) includes a tip 202 and an associated body 204. The body 204 defines a lumen 206, with at least one aperture 208 in fluid communication with the lumen 206 being defined in the tip 202 and/or the body 204. In one embodiment, a plurality of apertures 208 are uniformly positioned around the perimeter of the body 204 and/or tip 202, but it is also within the scope of the present disclosure for there to be only one aperture 208 or for a plurality of apertures 208 to be arranged in a non-uniform pattern.

The pin thermode 200 further includes a liquid source from which a liquid may be advanced into and through the lumen 206 to the aperture or apertures 208. From the aperture or apertures 208, the liquid is advanced out of the pin thermode 200 and into the region surrounding the pin thermode 200 (e.g., into a gap defined in the antenna 12 or into the fabric substrate 18). The nature of the liquid may vary, which may affect the optimal position of the aperture or apertures 208. For example, the liquid may be an adhesive that is the same as or similar to the adhesive 14 positioned between the RFID chip 10 and the antenna 12. In this case, it may be advantageous for at least one aperture 208 to be defined in the tip 202 so as to apply the adhesive to the RFID device. In another embodiment, the liquid may be an adhesive or varnish or flexible material, such as silicone rubber, which prevents moisture ingress. In this case, it may be advantageous for at least one aperture 208 to be defined in the body 204, such that a portion of the liquid may be applied to the fabric substrate 18 to strengthen and seal the region of the fabric substrate 18 penetrated by the pin thermode 200.

In one embodiment, the bottom pin is unheated and used as an anvil and the top pin is also unheated and used as an anvil to apply pressure, but has an optical path such as a fibre down through the centre to pass light, in particular infra-red, where wavelengths between approximately 1 um and 16 um are strongly adsorbed, that, once the chip is under pressure, applied infra-red light causes the chip to heat itself and cure the adhesive. Alternatively the bottom pin, top pin or both are made of an optically transparent material such as a glass.

In a further embodiment of the present invention, the adhesive to bond the chip cures when ultra violet light is applied via an optical path is incorporated into the bottom pin thermode.

In a further embodiment, the bottom pin thermode may transfer a catalyst, a curing agent and/or an accelerator either applied to the tip of the thermode or passed through a channel, into the adhesive, causing rapid curing, which may be exothermic to also heat the chip and adhesive to complete the bond. Curing agents can be latent, in that they are mixed with the adhesive, and activated, where a curing agent can be added as a two-part system. A range of chemical types can be used as curing agents, for example amines, anhydrides, phenol and thiols, and accelerators/catalysts added to latent curing mixtures, such as tertiary amines and alcohols. As the curing process for the epoxy adhesive can be highly exothermic, the pin thermodes may be of a high thermal conductivity and, depending on the amount of heat generated, cooled, to limit the peak temperature of the joint and chip to prevent damage to the substrate.

In a further embodiment the heat needed to cure the adhesive is provided by passing ultrasonic energy into the chip and hence the adhesive and antenna when they are in contact, where the mechanical energy is converted into thermal energy curing the adhesive and completing the joint between antenna and chip.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A method for assembling a Radio Frequency Identification (RFID) device comprising an RFID chip and an antenna, the method comprising the steps of:
   providing the RFID chip in the vicinity of the antenna associated with a fabric substrate with an adhesive positioned between the RFID chip and the antenna; and
   applying pressure and heat to either both the RFID chip and the antenna or any one of the RFID chip and the antenna using a top thermode and a pin thermode so as to cure the adhesive, wherein said applying pressure and heat to either both the RFID chip and the antenna or any one of the RFID chip and the antenna, comprises directly penetrating the fabric substrate with a tip of the pin thermode to move the tip into contact with or into the vicinity of the antenna and includes increasing a temperature of at least a portion of the tip.

2. The method of claim 1, wherein the tip has a cross-sectional area less than a cross-sectional area of the RFID chip or substantially equal to the cross-sectional area of the RFID chip.

3. The method of claim 1, wherein the pin thermode includes a body associated with the tip and formed of a low thermal conductivity material so as to not increase to the same temperature as said at least a portion of the tip.

4. The method of claim 1, wherein the pin thermode further comprises an actuator with an enlarged end configured to compress the tip made of a deformable material while the pin thermode applies force to the RFID device, causing an increase in a cross-sectional area of the tip.

5. The method of claim 1, wherein the tip includes a plurality of projections separately penetrating the fabric substrate.

6. The method of claim 1, further comprising advancing a liquid out of the pin thermode and into a region surrounding the pin thermode while the tip is penetrated into the fabric substrate.

* * * * *